June 9, 1964            N. W. BELL            3,136,900
CIRCUIT FOR DETECTING THE FREQUENCY DIFFERENCE OF
SIMULTANEOUSLY APPLIED ALTERNATING CURRENT
SIGNALS AS A DIRECT CURRENT SIGNAL
Filed Oct. 19, 1961
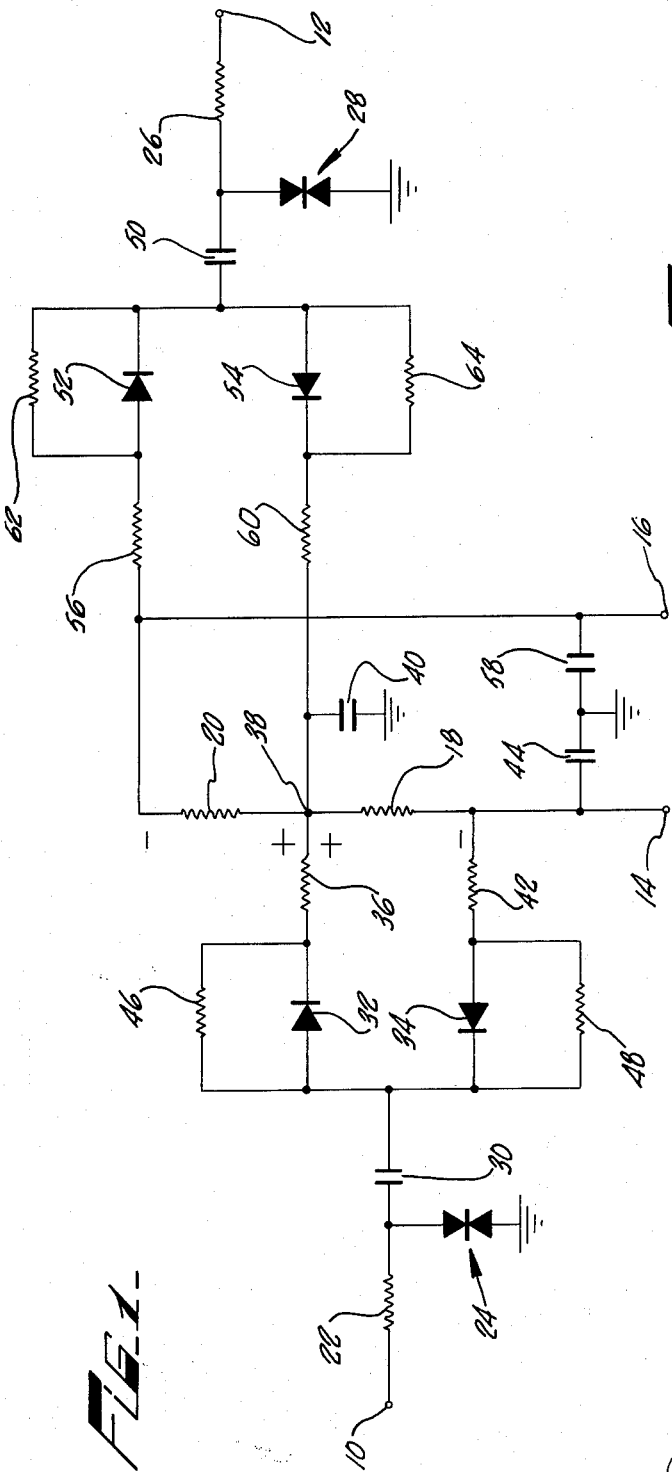
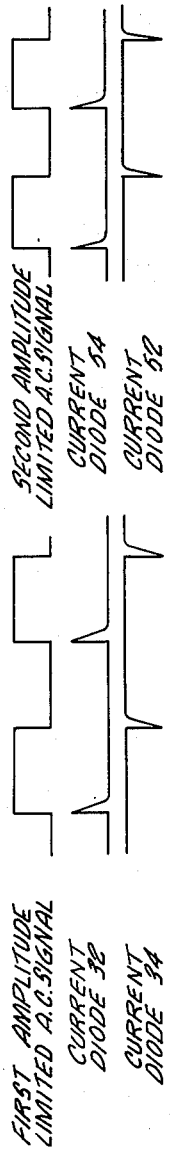
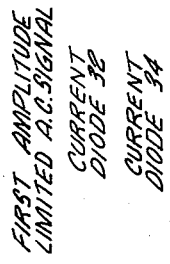
INVENTOR.
NORTON W. BELL
BY
Christie Parker & Hale
ATTORNEYS.

United States Patent Office 3,136,900
Patented June 9, 1964

3,136,900
CIRCUIT FOR DETECTING THE FREQUENCY DIFFERENCE OF SIMULTANEOUSLY APPLIED ALTERNATING CURRENT SIGNALS AS A DIRECT CURRENT SIGNAL
Norton W. Bell, Monrovia, Calif., assignor, by mesne assignments, to Bell & Howell Company, Chicago, Ill., a corporation of Illinois
Filed Oct. 19, 1961, Ser. No. 146,169
5 Claims. (Cl. 307—88.5)

This invention is directed to improvements in frequency discriminator apparatus, and more particularly, to a novel frequency discriminator for developing a direct current signal which is directly proportional to the sum of or difference between the frequency of two alternating current signals.

Generally, in systems wherein it is desired to develop a direct current signal having a magnitude determined by the sum or difference frequency of two alternating current signals, it is necessary to utilize a combination of two isolated frequency discriminator circuits and a separate summing network. The present invention, on the other hand, provides a novel frequency discriminator circuit design for simultaneously receiving two alternating current signals and developing, in a single circuit, an isolated direct current output signal which is directly proportional to either the sum or difference in frequency of the two alternating current signals.

Briefly, to accomplish this, a basic form of the present invention includes first and second load means coupled in series between two output terminals and first and second input means for receiving first and second alternating current signals, respectively. Coupled to the first input means are means for passing a unidirectional current proportional to the frequency of the first alternating current signal through the first load means. Coupled to the second input means are means for passing a unidirectional current proportional to the frequency of the second alternating current signal through the second load means. In this manner direct current voltages are developed across the first and second load means which are directly proportional to the frequency of the first and second alternating current signals, respectively. Depending upon the relative polarity of the unidirectional currents, a direct current voltage signal is then developed between the output terminals which is proportional to either a sum or difference frequency of the first and second alternating current signals.

Briefly, to develop the unidirectional current signals proportional to the frequency of the first and second alternating current signals, the first and second alternating current signals are separately limited in amplitude relative to a reference potential. This prevents changes in amplitude of the alternating current signals from affecting the amplitude of the output signal to falsely indicate a frequency change in either the first or second alternating current signals. The amplitude limited signals are then differentiated to develop positive and negative-going signals corresponding to the leading and trailing edges respectively, of the amplitude limited signals. The positive and negative-going signals are each steered by unidirectional current conductive means to a signal integrator coupled to the source of reference potential to develop a unidirectional current signal. The rate at which the positive and negative-going signals are developed from an amplitude limited signal is equal to the frequency of the amplitude limited signal. Thus the unidirectional current signals developed by the signal integrators are directly proportional to the frequencies of the first and second alternating current signals and may be applied to the first and second load means to develop the desired direct isolated current output voltage.

As briefly described above, the frequency discriminator circuit of the present invention provides means for developing a direct current signal proportional to the frequency of two alternating current signals. For a more complete understanding of the novel circuit features which provide means for developing such an output signal, however, reference should be made to the following detailed description which is to be considered with the drawing, in which:

FIGURE 1 is a schematic representation of a preferred embodiment of the frequency discriminator of the present invention; and FIGURE 2 is a graphical representation of the waveforms associated with the frequency discriminator represented in FIGURE 1.

As represented in FIGURE 1 of the drawing, the frequency discriminator of the present invention includes a pair of input terminals 10 and 12 for receiving a first alternating current signal and a second alternating current signal, respectively. The frequency discriminator also includes a first and a second output terminal 14 and 16. Coupled in series between the output terminals 14 and 16 are load means 18 and 20. As will be described hereinafter, a first direct current voltage signal is developed across the load means 18 which is proportional to the first alternating current signal while a direct current voltage signal is developed across the load means 20 which is proportional to the second alternating current signal. Depending upon the polarity of these voltage signals, an output voltage signal is developed between the output terminals 14 and 16 which is proportional to either a frequency sum or difference of the first and second alternating current signals.

To accomplish this, means are coupled to the input terminal 10 for limiting the amplitude of the first alternating current signal relative to a source of reference potential. This prevents changes in the amplitude of the first alternating current from affecting the magnitude of the voltage signal developed across the load means 18 to falsely indicate a change in the frequency of the first alternating current signal. By way of example only, the amplitude limiting means is represented as including a resistor 22 coupled to the input terminal 10 and a double anode breakdown diode 24 coupled between the resistor 22 and the source of reference potential represented which is as ground. The resistor 22 has a resistance which is substantially greater than the forward resistance of the diode 24.

As is commonly known, a double anode breakdown diode is equivalent to two series opposing breakdown (Zener) diodes which may be both forward as well as reverse biased to a low resistance or high conductance state. Thus, during a positive half-cycle of the first alternating current signal one breakdown diode component of the double anode diode 24 is immediately forward biased. When the amplitude of the first alternating current signal reaches a value for which a voltage substantially equal to the reverse breakdown voltage of the other breakdown diode component is developed across the diode 24 the other breakdown component switches to a low resistance state. The diode 24 then provides a low resistance current path to ground which clamps the voltage at a junction of the resistor 22 and the diode 24 thereby limiting the amplitude of the positive-going portion of the first alternating current signal.

A like operation occurs during the negative half-cycle of the first alternating current signal. Thus, the amplitude limiter arrangement coupled to the input terminal 10 develops a first amplitude limited signal from the first alternating current signal having a substantially rectangular waveform. The waveform of the first amplitude limited signal is graphically represented in FIGURE 2.

In a similar manner an amplitude limiter arrangement including a resistor 26 and a double anode breakdown diode 28 is coupled to the input terminal 12. Thus, as represented in FIGURE 2, a second amplitude limited signal having a rectangular waveform is developed from the second alternating current signal.

As briefly described above, the direct current voltages proportional to the frequency of the first and second alternating current signals are developed by passing unidirectional current signals proportional to the frequency of the first and the second alternating current signals through the first and second load means, respectively. To develop a unidirectional current signal proportional to the frequency of the first alternating current signal a capacitor 30 is coupled in series with the resistor 22. Coupled to the capacitor 30 are a pair of diodes 32 and 34, respectively. The diodes 32 and 34 are poled in opposite directions relative to the capacitor 30. The diode 32 is coupled through a resistor to a junction 38 of the load means 18 and 20 and through a blocking capacitor 40 to ground. The diode 34 is coupled through a resistor 42 to the output terminal 14 and through a blocking capacitor 44 to ground.

Due to the relative poling of the diodes 32 and 34, in response to the first amplitude limited signal, the capacitor 30 is charged through the diode 32, the resistor 36, to ground through the capacitor 40 and is discharged from ground through the capacitor 44, the resistor 42, and the diode 34.

Preferably the values of the resistors 36 and 42 and the capacitor 30 are chosen such that a product of the value of the resistor 36 and the capacitor 30 as well as a product of the value of the resistor 42 and the capacitor 30 is substantially less than the period of the first alternating current signal. In this manner the capacitor 30 rapidly charges and discharges in response to the leading and trailing edges, respectively, of the first amplitude limited signal. Accordingly, the capacitor 30 together with the resistors 36 and 42 defines a signal differentiator means for developing positive and negative-going signals corresponding respectively to the leading and trailing edges of the first amplitude limited signal.

The diode 32 steers the positive-going signal through the resistor 36 while the diode 34 steers the negative-going signal through the resistor 42. The waveforms of the current signals passing through the diodes 32 and 34 are graphically illustrated in FIGURE 2. As represented, a positive and negative-going signal are produced for each cycle of the first amplitude limited signal. Thus, the rate at which the positive and negative-going signals are developed is equal to the frequency of the first alternating current signal. Since the amplitude of the positive and negative-going signal is limited, the average current value passing through the diodes 32 and 34 varies directly with the rate at which the positive and negative-going signals are developed and is hence directly proportional to the frequency of the first alternating current signal. To pass such an average current through the load means 18 and hence develop a direct current voltage which is directly proportional to the frequency of the first alternating curent signal the resistors 36 and 42 in combinaiton respectively with the blocking capacitors 40 and 44, function as signal integrator means.

The integrator defined by the resistor 36 and the capacitor 40 passes alternating current signal portion of the positive-going signal through the capacitor 40 to ground while passing the average or direct current portion thereof through the load resistor 18. In a similar manner the integrator defined by the resistor 42 and the capacitor 44 passes the alternating current signal portion of the negative-going signal through the capacitor 44 to ground while passing the direct current signal thereof through the load means 18. Thus separate alternating and direct current signal paths are provided for the signals passing through the diodes 32 and 34 to develop a unidirectional current signal passing through the load means 18 which has a magnitude equal to the average value of the positive and negative-going signals. Due to the capacitive coupling to ground provided by the capacitors 40 and 44, the unidirectional current signal develops a direct current voltage across the load means 18 which is directly proportional to the frequency of the first alternating current signal and which is isolated from ground.

As represented in FIGURE 1, the diodes 32 and 34 are preferably shunted by resistors 46 and 48, respectively. Since a diode inherently possesses a non-linear resistance between its forward and reverse biased state, shunting the diodes 32 and 34 with a large resistance maintains a constant resistance across the diodes while the diodes are switching from a reverse to a forward biased state and thereby improves the linear operation of the frequency discriminator.

To develop a unidirectional current signal proportional to the frequency of the second alternating current signal, a capacitor 50 is coupled in series with the input terminal 12 through the resistor 26. Coupled to the capacitor 50 is a pair of diodes 52 and 54. The diodes 52 and 54 are poled in opposite directions relative to the capacitor 50. The diode 52 is coupled through a resistor 56 to the output terminal 18 and through a blocking capacitor 58 to ground while the diode 54 is coupled through a resistor 60 to the junction 38 and through the capacitor 40 to ground.

Due to the relative poling of the diodes 52 and 54 in response to the second amplitude limited signal the capacitor 50 is charged through the diode 54, the resistor 60, and the capacitor 40 to ground and discharged from ground through the capacitor 58, the resistor 56, and the diode 52.

Preferably the values of the resistors 56 and 60 as well as the capacitor 50 are so proportioned such that a product of the resistor 56 and the capacitor 50 and a product of the resistor 60 and the capacitor 50 is substantially less than the period of the second alternating current signal. In this manner a capacitor 50 rapidly charges and discharges in response to the leading and trailing edges, respectively, of the second amplitude limited signal. Accordingly the capacitor 50, together with the resistors 56 and 60, defines a differentiating means for differentiating the second amplitude limited signal to develop positive and negative-going signals corresponding to a leading and trailing edge respectively, of the second amplitude limited signal.

The diode 54 steers the positive-going signal through the resistor 60 while the diode 52 steers the negative-going signal through the resistor 56. The waveform of the current signals passing through the diodes 52 and 54 are graphically illustrated in FIGURE 2. As represented a positive and a negative-going signal is developed for each cycle of the second amplitude limited signal. Thus, the rate at which the positive and negative-going signals are developed is equal to the frequency of the second alternating current signal. Since the amplitude of the positive and negative-going signals is limited, the average current value passing through the diodes 52 and 54 varies directly with the rate at which the positive and negative-going signals are developed and is hence directly proportional to the frequency of the second alternating current signal.

To pass such an average current through the load means 20 and hence develop a direct current voltage directly proportional to the frequency of the second alternating current signal the resistors 56 and 60, in combination, respectively, with the blocking capacitors 40 and 58, function as signal integrator means. The integrator formed by the resistor 60 and the capacitor 40 passes the alternating current portion of the positive-going signal through the capacitor 42 to ground while passing the average or direct current component thereof through the load means 20. Similarly, the integrator defined by the resistor 56 and the capacitor 58 passes the alternating current portion of the negative-going signal component through the capacitor 58 to ground while passing the average or direct current portion thereof through the load means 20. Thus, separate alternating current and direct current signal paths are provided for the signals passing through the diodes 52 and 54 to develop a unidirectional current signal passing through the load means 20 which has a magnitude equal to the average value of the positive and negative-going signals derived from the second amplitude limited signal. Due to the capacitive coupling to ground provided by the capacitors 40 and 58, the unidirectional current signal develops a direct current voltage across the load means 20 which is directly proportional to the frequency of the second alternating current signal and which is isolated from ground.

Due to the relative poling of the diodes 52 and 54 as well as a relative poling of the diodes 32 and 34, the voltages developed across the load means 18 and 20 are series-opposing and the direct current voltage developed between the output terminals 14 and 16 is directly proportional to any frequency difference between the first and second alternating current signals. However, it is understood that by reversing the polings of either the pair of diodes 32 and 34 or the pair of diodes 52 and 54, voltage signals may be developed across the load means 18 and 20 which are series-aiding thereby developing a direct current voltage between the output terminals 14 and 16 which is directly proportional to a frequency sum of the first and second alternating current signals.

In a manner similar to that described in connection with diodes 32 and 34, the diodes 52 and 54 are also preferably shunted by resistors, represented at 62 and 64, respectively. The resistors 62 and 64 have large resistance values relative to the forward resistance of diodes 52 and 54. Thus, a large resistance is maintained across the diodes 52 and 54 while switching from a reverse to a forward biased state to improve the linear operation of the frequency discriminator.

What is claimed is:

1. A frequency discriminator comprising: first and second input means for receiving a first and a second alternating current signal, respectively; first and second output terminals; first and second load means coupled in series between the first and second output terminals; means coupled to the first input means for limiting the amplitude of the first alternating current signal relative to a reference potential; means coupled to the second input means for limiting the amplitude of the second alternating current signal relative to the reference potential; a first capacitor coupled to the first input means; a second capacitor coupled to the second input means; a first unidirectional current conductive device coupled between the first capacitor and a junction of the first and second load means; a second unidirectional current conductive device coupled between the first capacitor and the first output terminal, the first and second unidirectional current conductive devices being poled in opposite directions relative to the first capacitor; means defining an alternating current path to a source of the reference potential coupled to the first output terminal; a third unidirectional current condutcive device coupled between the second capacitor and the junction of the first and second load means; a fourth unidirectional current conductive device coupled between the second capacitor and the second output terminal, the third and fourth unidirectional current conductive devices being poled in opposite directions relative to the second capacitor; and means defining an alternating current path to the source of reference potential coupled to the second output terminal.

2. The apparatus defined in claim 1 wherein each unidirectional current conductive device possesses a predetermined forward resistance in the direction of current flow and wherein the apparatus includes a first resistor coupling the first unidirectional current conductive device to the junction of the first and second load means, a second resistor coupling the second unidirectional current conductive device to the first output terminal, a third resistor coupling the third unidirectional current conductive device to the junction of the first and second load means, a fourth resistor coupling the fourth unidirectional current conductive device to the second output means, a fifth resistor shunting the first unidirectional current conductive device and having a resistance which is substantially greater than the forward resistance of the first unidirectional current conductive device, a sixth resistor shunting the second unidirectional current conductive device and having a resistance which is substantially greater than the forward resistance of the second unidirectional current conductive device, a seventh resistor shunting the third unidirectional current conductive device and having a resistance which is substantially greater than the forward resistance of the third unidirectional current conductive device and an eighth resistor shunting the fourth unidirectional current conductive device and having a resistance which is substantially greater than the forward resistance of the fourth unidirectional current conductive device, a product of the value of the first resistor and the first capacitor and a product of the second resistor and the first capacitor being substantially less than the period of the first alternating current signal, a product of the value of the third resistor and the second capacitor and a product of the fourth resistor and the second capacitor being substantially less than the period of the second alternating current signal.

3. A frequency discriminating circuit for developing a signal proportional to a frequency sum or difference of two alternating current signals comprising: a first input means for receiving a first alternating current signal; a second input means for receiving a second alternating current signal; first and second output terminals; first and second load means connected in series between the first and second output terminals; a first unidirectional current conductive means coupled between the first input means and a junction of the first and second load means; a second unidirectional current conductive means coupled between the first input means and the first output terminal, the first and second unidirectional conductive means being poled for series current flow; a first means defining an alternating current path to a source of reference potential coupled to the first output terminal; a third unidirectional current conductive means coupled between the second input means and the junction of the first and second load means; a fourth unidirectional current conductive means coupled between the second output terminal and the second input means, the third and fourth unidirectional conductive means being poled for series current flow; and second means defining an alternating current path to the source of reference potential coupled to the second output terminal.

4. A frequency discriminator circuit for developing a direct current signal proportional to a frequency sum or difference of two alternating current signals comprising: a first input means for receiving a first alternating current signal; a second input means for receiving a second alternating current signal; first and second output means; first and second load means connected in series between said first and second output terminals; a first means coupled to the first output terminal defining a first alternating current path to a source of reference potential; a second means coupled to the second output terminal defining a second alternating current path to the source of reference potential; means coupled between the first input means and the first load means for passing a unidirectional current proportional to the frequency of the first alternating current signal through the first load means and the first alternating current path; and means coupled between the second input means and the second load means for passing a unidirectional current proportional to the frequency of the second alternating current signal through the second load means and the second alternating current path.

5. A frequency discriminator for developing a direct current signal proportional to a frequency sum or difference of two alternating current signals comprising: a first input for receiving a first alternating current signal; a second input for receiving a second alternating current signal; first and second output terminals; first and second load means connected in series between the first and second output terminals; first and second blocking capacitors connected in series between the first and second output terminals, a junction of the first and second capacitors being connected to a source of reference potential; a first capacitor connected in series with the first input; a second capacitor connected in series with the second input; a first diode connected between the first capacitor and the common connection between the first and second load means; a second diode connected between the first capacitor and the first output terminal, the first and second diodes being poled in opposite directions relative to the first capacitor; a third diode connected between the second capacitor and the common connection; and a fourth diode connected between the second capacitor and the second output terminal, the third and fourth diodes being poled in opposite directions relative to the second capacitor.

References Cited in the file of this patent

UNITED STATES PATENTS

| | | |
|---|---|---|
| 2,320,476 | Schrader et al. | June 1, 1943 |
| 3,021,481 | Kalmus et al. | Feb. 13, 1962 |